No. 699,714. Patented May 13, 1902.
C. REINKER.
HEADLIGHT FOR MOTOR CARS.
(Application filed Feb. 11, 1901.)

(No Model.)

ATTEST
R B Moser
H. E. Mudra

INVENTOR.
Christian Reinker
By W. T. Fisher
ATTY

UNITED STATES PATENT OFFICE.

CHRISTIAN REINKER, OF CLEVELAND, OHIO.

HEADLIGHT FOR MOTOR-CARS.

SPECIFICATION forming part of Letters Patent No. 699,714, dated May 13, 1902.

Application filed February 11, 1901. Serial No. 46,840. (No model.)

*To all whom it may concern:*

Be it known that I, CHRISTIAN REINKER, a citizen of the United States, residing at Cleveland, in the county of Cuyahoga and State of Ohio, have invented certain new and useful Improvements in Headlights for Motor-Cars; and I do declare that the following is a full, clear, and exact description of the invention, which will enable others skilled in the art to which it appertains to make and use the same.

My invention relates to means for maintaining and interchanging electric headlights for electrically-driven cars, or what are commonly known as "motor-cars" or "electric cars;" and the main object of the invention is to provide and equip a car of this kind with a dual headlight illumination alternative as to use and designed for interurban lines and for city and country uses, according as the car is on one or the other portion of its trip.

In rural or country districts especially it is very desirable to have a bright strong light which can be thrown far ahead upon the track and enable the motorman to observe the track for obstructions, for hailing passengers, and for many other purposes and reasons; but when the same car comes within the corporate limits of a city where there are street-lights and a flashing headlight will frighten horses and is objectionable otherwise the dazzling country light should be exchanged for one less brilliant and noticeable. Hence my invention has in view the furnishing of both kinds of lights in the same headlight or reflector, and to this end I show a headlight equipped with both an arc-lamp and an incandescent lamp and both deriving their current through the trolley and distributed thence by wires to said lamps, all substantially as shown and described.

Figure 1:
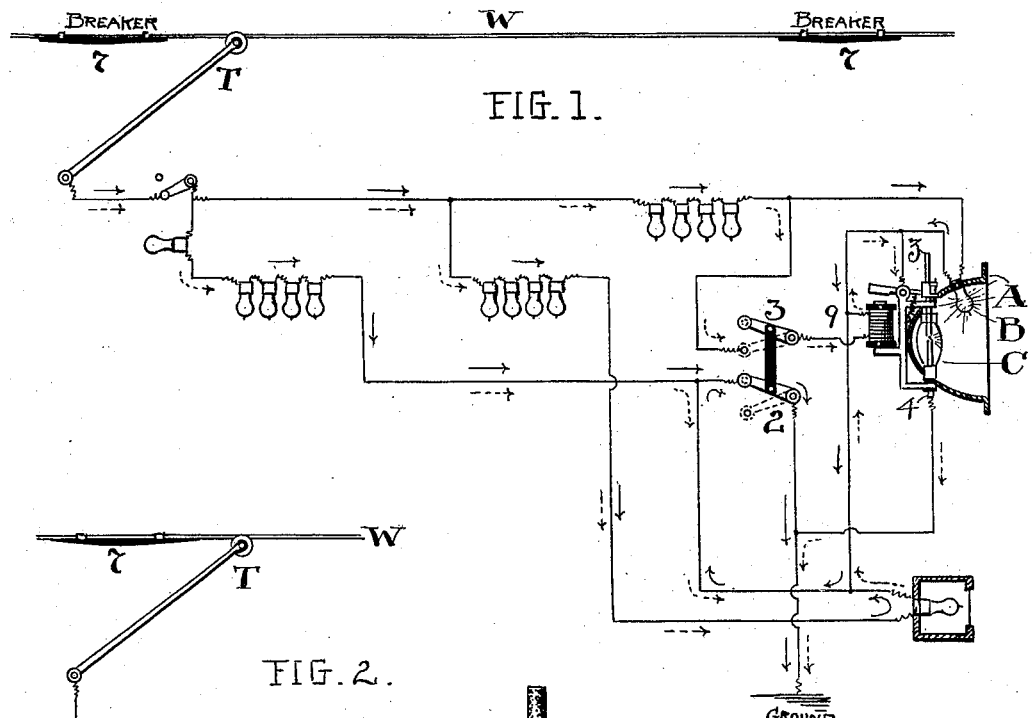
Figure 2:
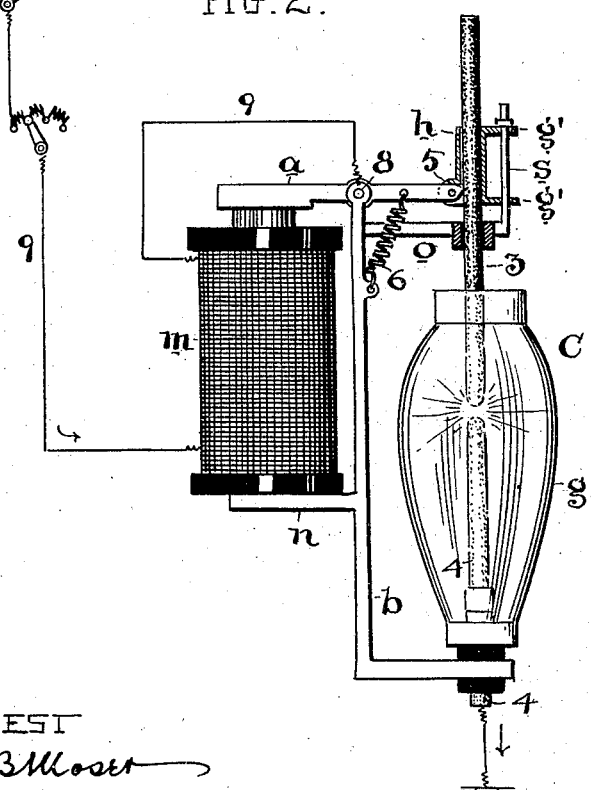

In the accompanying drawings, Figure 1 is a diagrammatic view of what may be regarded as the wiring of a car for my purposes and the circuits in which are located an arc-lamp and an incandescent in the headlight together, as well as the trolley and feed wire over the car. Fig. 2 is a plain elevation of the arc-lamp and its associated mechanism with somewhat of a diagrammatic illustration of the wiring and trolley connections.

Referring to Fig. 1, A represents what may be termed a "headlight" or "reflector," B an incandescent lamp therein, and C an arc-lamp. Each lamp has its own immediate wire-circuit and its own switch 2 and 3, respectively.

Lamp B is an ordinary incandescent lamp of any desired candle-power, while lamp C is common only in the one thing, of its carbons 3 and 4; otherwise this lamp is essentially new both in construction and mode of operation, as we shall see. In detail the said lamp comprises a right-angled bracket $b$, which is shown as a support for practically all the other parts, comprising magnet, globe $g$, armature $a$, standard $s$, and the carbons 3 and 4 in their immediate supports. The lower right-angled portion of bracket $b$ supports the globe and the lower carbon, and an arm $n$ to the rear on said bracket carries the magnet. Standard $s$ is supported by an arm $o$ of its own, provided with an eye through it for the passage of carbon 3. Said arm might be bent around the carbon; but in this case it forms a part of the guide and support for the carbon and is enlarged about the eye to afford a more extended bearing than it would otherwise have.

The means for supporting the upper carbon in working relation comprise a sleeve $h$, which has ears $g'$, engaged freely on standard $s$, so as to slide up and down thereon and give a fixed relation to sleeve $h$, which is the rear guide and carrier for carbon 3. The carbon is designed to be somewhat free in said sleeve, and armature $a$ is pivoted in or at the lower end of the sleeve and projects at its point 5 past its pivot against the carbon in such way that it will form a grip and hold the carbon up normally. A normal position is seen in Fig. 2, and the armature-point presses the carbon against the wall of sleeve $h$, and the carbon is held up; but when the current is cut out of magnet $m$ even momentarily and the armature is released and pulled down by spring 6 carbon 3 is so far liberated by the armature that it can drop into touch with carbon 4 below. Then as the armature again comes under the power of the magnet it regrips the carbon, but at a higher point than before, and lifts it just enough to reëstablish an arc. It follows in the operation that the drop of the upper carbon is farther than the drop of the point 5 of the armature, so that if the armature be released at suitable intervals and successively as the carbon burns away and needs further feed the desired feed can be obtained in this way, even though the carbon be immediately picked up again after it has been dropped. This, in fact, is the plan and purpose of this simple mechanism, and to effect release of the carbon-gripping mechanism I avail myself of the not too frequent so-called "breakers" 7 in the trolley-wire W of interurban or country roads especially. These breakers are short insulated or non-conducting sections in the trolley line-wire where breaks in the current-supply are purposely made to insure a more steady volume of current in long lines than could otherwise be obtained, as is now well known in the operation of such roads. As the trolley T passes over one of these breakers it usually is only an instant interruption; but that is sufficient to drop and regrip the carbon by my mechanism, and these breakers are at sufficiently close intervals to afford the only interruption the mechanism requires for keeping the lamp in good working condition. However, if necessary I can introduce the equivalent of these breakers at intervals here and there along the line, using them only for momentarily engaging the trolley apart from the wire and then going on as before. If a line has no breakers, these can be supplied in lieu thereof, and of course a pull down on the trolley-rope will enable the conductor to feed the carbon when needed regardless of special means for breaking the current through the trolley. My idea, however, is to have all this occur automatically as planned and not place an additional burden on the conductor.

Armature $a$ is shown as having its operating-pivot at 8 on the top of bracket $b$, and the current reaches the upper carbon through the armature chiefly and more or less through arm $o$ and sleeve $h$ and wire 9 from trolley-pole P. The live wires as the parts are connected up herein are indicated by full arrows and the dead wires by dotted arrows.

It should have been stated that sleeve $h$ drops down on post $s$ with the dropping of armature-point 5 and rises with it; but the carbon drops as much farther that the sleeve as it has burned away.

What I claim is—

1. In motor-cars, an arc-lamp having magnet-controlling mechanism, in combination with electrical circuits for said lamp having trolley-wire and trolley-pole connections for conveying the current, and non-conducting sections on said trolley-wire to momentarily cut off the current-supply and thereby actuate said magnet-controlling mechanism, substantially as described.

2. A headlight for cars having an arc-lamp with magnet-controlling mechanism, in combination with a series of incandescent lamps for lighting the car, trolley-wire and trolley-pole with circuits leading to said incandescent lamps and arc-lamps, and non-conducting sections on the trolley line-wire to cut off the current at intervals whereby said arc-light-controlling mechanism is actuated, substantially as described.

3. A headlight for cars having both an arc-lamp and an incandescent lamp, in combination with electrical circuits for said lamps having trolley-wire and trolley-pole connections for conveying the current, and non-conducting sections on said trolley-wire to cut off the current-supply at intervals, substantially as described.

4. In motor-cars, the combination of a trolley-wire, trolley-pole, and non-conducting sections on said wire to break the flow of current, with a headlight having an arc-lamp and an incandescent lamp arranged in electrical circuit with a series of car-lighting lamps, and means to switch either of said headlight-lamps into said circuit, substantially as described.

5. In arc-lamps, a supporting-bracket for both carbons, a magnet and an armature controlled thereby and a sleeve pivoted on one end of said armature and a post in which the sleeve slides, and a spring arranged to pull the armature away from the magnet, substantially as described.

Witness my hand to the foregoing specification this 25th day of January, 1901.

CHRISTIAN REINKER.

Witnesses:
R. B. MOSER,
H. E. MUDRA.